(12) United States Patent
Traut et al.

(10) Patent No.: US 7,533,207 B2
(45) Date of Patent: May 12, 2009

(54) OPTIMIZED INTERRUPT DELIVERY IN A VIRTUALIZED ENVIRONMENT

(75) Inventors: Eric P. Traut, Bellevue, WA (US); Rene Antonio Vega, Kirkland, WA (US); Shuvabrata Ganguly, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 135 days.

(21) Appl. No.: 11/635,455

(22) Filed: Dec. 6, 2006

(65) Prior Publication Data
US 2008/0141277 A1 Jun. 12, 2008

(51) Int. Cl.
*G06F 9/48* (2006.01)
(52) U.S. Cl. .................. 710/260; 710/263; 710/264; 718/108; 719/313; 719/318
(58) Field of Classification Search .......... 710/260, 710/262, 263, 264; 718/108; 719/313, 314, 719/318, 324
See application file for complete search history.

(56) References Cited

U.S. PATENT DOCUMENTS

| | | | |
|---|---|---|---|
| 4,812,967 A | 3/1989 | Hirosawa et al. | 710/269 |
| 4,975,836 A | 12/1990 | Hirosawa et al. | 718/100 |
| 5,488,716 A | 1/1996 | Schneider et al. | 714/10 |
| 5,511,217 A | 4/1996 | Nakajima et al. | 718/100 |
| 5,872,982 A * | 2/1999 | Tipley | 710/240 |
| 6,412,035 B1 * | 6/2002 | Webber | 710/261 |
| 6,944,699 B1 | 9/2005 | Bugnion et al. | 710/269 |
| 7,209,994 B1 * | 4/2007 | Klaiber et al. | 710/264 |
| 2003/0061497 A1 | 3/2003 | Zimmer | 713/189 |
| 2004/0117532 A1 | 6/2004 | Bennett et al. | 710/260 |
| 2005/0060703 A1 | 3/2005 | Bennett et al. | 718/1 |
| 2005/0080965 A1 | 4/2005 | Bennett et al. | 710/200 |
| 2005/0246453 A1 | 11/2005 | Erlingsson et al. | 710/1 |
| 2006/0015869 A1 | 1/2006 | Neiger et al. | 718/1 |
| 2006/0036791 A1 | 2/2006 | Jeyasingh et al. | 710/260 |
| 2006/0184713 A1 * | 8/2006 | Hildner | 711/6 |
| 2006/0200616 A1 * | 9/2006 | Maliszewski | 711/6 |
| 2006/0236094 A1 * | 10/2006 | Leung et al. | 713/152 |
| 2007/0157197 A1 * | 7/2007 | Neiger et al. | 718/1 |

OTHER PUBLICATIONS

Furman, R.E., "Interrupt Handling with VxDS optimizes multitasking OS," http://www.driverlinx.com/Publications/W95Driver/Win95Part4.pdf, *Win95 Device Drivers—Part 4*, 1996, 39-44.

(Continued)

*Primary Examiner*—Glenn A Auve
(74) *Attorney, Agent, or Firm*—Woodcock Washburn LLP

(57) ABSTRACT

Various operations are disclosed for improving the operational efficiency of interrupt handling in a virtualized environment. A virtualized interrupt controller may obviate the need for an explicit end-of-interrupt command by providing an automatic EOI capability even when a physical interrupt controller offers no such mechanism. The use of a message pending bit for inter-partition communications facilitates avoiding an EOI command of inter-processor interrupts used in inter-partition communications whenever no further messages are cued for a particular message slot. A virtualized interrupt controller facilitates the selective EOI of an interrupt even when it is not the highest priority in-service interrupt irrespective of whether a physical interrupt controller provides such functionality.

20 Claims, 9 Drawing Sheets

OTHER PUBLICATIONS

Kaneda, K. et al., "A Virtual Machine Monitor for Providing a Single System Image," http://web.yl.is.s.u-tokyo.ac.jp/~kaneda/dvm/ipdps2006.pdf, 2006, 15 pages.

Whitaker, A. et al., "Denali: Lightweight Virtual Machines for Distributed and Networked Applications," http://www.cs.ucla.edu/~miodrag/cs259-security/whitaker02denali.pdf, 2002, 14 pages.

Younis, M. et al., "An Approach for Supporting Temporal Partitioning and Software Reuse in Integrated Modular Avionics," http://ieeexplore.ieee.org/iel5/6875/18516/00852451.pdf?isNumber&htry=1, 2000, 11 pages.

* cited by examiner

OPTIMIZED INTERRUPT DELIVERY IN A VIRTUALIZED ENVIRONMENT

BACKGROUND

A virtual machine ("VM") is a software construct or the like operating on a computing device or the like (e.g., a host) for the purpose of providing an emulated machine or system. Typically, although not necessarily, the VM is an application or the like, and may be employed on the host to instantiate a use application or the like while at the same time isolating such use application from such host device or from other applications on such host. In one typical situation, the host can accommodate a plurality of deployed VMs, each VM performing some predetermined function by way of resources available from the host.

Notably, each VM as hosted on a computing device is for all intents and purposes a computing machine, although in virtual form, and thus represents itself as such both to the use application thereof and to the outside world. As an example, the VM and/or a use application thereof can and in fact do issue hardware requests for hardware resources of the VM, even though the VM might not in reality have such hardware resources. Instead, and as may be appreciated, such hardware requests are intercepted or otherwise redirected toward the host, and such host services such hardware requests based on the hardware resources thereof, typically with the requesting VM and/or use application thereof being none the wiser.

Typically, although not necessarily, a host deploys each VM thereof in a separate partition, address space, processing area, and/or the like. Such host may include a virtualization layer with a virtual machine monitor ("VMM") or the like that acts as an overseer application or 'hypervisor', where the virtualization layer oversees and/or otherwise manages supervisory aspects of each VM of the host, and acts as a possible link between each VM and the outside world. The VMM may be a separate application running in its own address space or may be integrated more closely with the host operating system, either directly or as an operating system extension of some sort, such as a device driver. Notably, the VMM of the host may intercept or otherwise redirect hardware requests that originate from each VM of the host and/or a use application thereof, and may at least assist in servicing the requests, again with the requesting VM and/or use application thereof being none the wiser.

Many computing systems comprise multiple processors. Processors in a multiprocessor virtual machine environment may operate in a guest mode or in a VMM mode. When running in a guest mode, a processor uses virtual machine definitions to manage the virtual machine's guest operating system and applications, translating arguments and managing system resources without intervention from the VMM. From time to time, the guest operating system or applications may need system resources that must be managed by the VMM. As examples, the VMM may be required for error handling, system faults, or interrupt handling. In these situations, the processor operates in a VMM mode.

Modern processing systems include support for interrupts, which allow processors to be notified of external events. For example, when a user presses a key on a keyboard or a network packet arrives over the wire, a corresponding interrupt is generated and sent to a processor. Typically, an interrupt causes a processor to stop what it's doing, record its current execution location so it can resume execution after servicing the interrupt, and then execute a specified interrupt service routine.

Computing systems may comprise one or more interrupt controllers that direct and arbitrate the flow of interrupts in the system. The interrupt controller logic may be embodied in a discrete hardware component, may be integrated into a processor, or may be virtualized. The interrupt controller is responsible for, among other things, determining the priority of interrupts and for directing interrupts to appropriate processors in a multi-processor environment. In a virtualized environment, processors and interrupt controllers may be virtualized. This is generally accomplished through a combination of software, such as a virtual machine monitor, and virtualization assists provided by hardware.

Generally, after an interrupt has been handled, the interrupt controller is notified via and end-of-interrupt (EOI) command. It tells the interrupt controller that other interrupts whose delivery may have been deferred while a previous interrupt was being handled may now be delivered. An EOI command is typically delivered to an interrupt controller though an I/O port or a memory-mapped I/O access, such as a read from or write to a register. For physical interrupt controllers, processing an EOI command may consume tens or hundreds of cycles. For virtualized interrupt controllers, processing an EOI command may consume thousands of cycles.

Some virtual machine monitors use interrupts as a basis for inter-partition messaging. If software running within one partition needs to communicate with software running within a second partition on the same physical machine, it is able to do so through the use of inter-partition messages. When a message is sent by one processor, the virtual machine monitor may send an interrupt to the processor that is the intended recipient of the message, causing the recipient processor's interrupt service routine to process the message and respond to its contents.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Mechanisms for efficiently handling interrupts in a multi-processor virtualized environment are described herein. In some embodiments, a guest operating system may program certain interrupt sources as "automatic end-of-interrupt" ("auto-EOI"). When an auto-EOI is processed, a virtualized interrupt controller clears the bit in an interrupt service register corresponding to a delivered interrupt without waiting for an explicit end-of-interrupt ("EOI") command. The auto-EOI interrupt may not block the delivery of other interrupts.

Interrupts may be used to implement inter-partition communication. When a guest operating system receives an interrupt associated with an inter-partition message, an interrupt service routine of the guest operating system reads the message from a specified message slot and performs an action based on the message type and payload. As described in detail below, the guest operating system can eliminate some of the overhead incurred in processing inter-partition messages by sending an explicit end-of-message ("EOM") command upon completion of message processing only if another message is queued for the same message slot. The computational cost of an EOM command is roughly equivalent to the computational cost of an EOI, but the EOM is sent only in the rare case that an additional message is queued. This can significantly reduce the average cost of interrupt processing for inter-partition communications.

Interrupts can have various priorities. Generally, a higher priority interrupt can interrupt processing of a lower priority interrupt, but not vice versa. In a virtualized environment, it is possible for a guest operating system to issue an EOI command for an interrupt that is not the highest priority in-service interrupt. A mechanism is described herein whereby a virtualized interrupt controller checks whether an incoming EOI command corresponds to the highest priority in-service interrupt. If not, the virtualized interrupt controller adds the interrupt vector for the incoming EOI command to the set of interrupts that need to be EOIed at a later time. If the incoming EOI command does correspond to the highest priority in-service interrupt, the virtualized interrupt controller not only processes the EOI command for the corresponding interrupt but also for all other interrupts that were previously marked for later EOIs.

DETAILED DESCRIPTION

Figure 1:
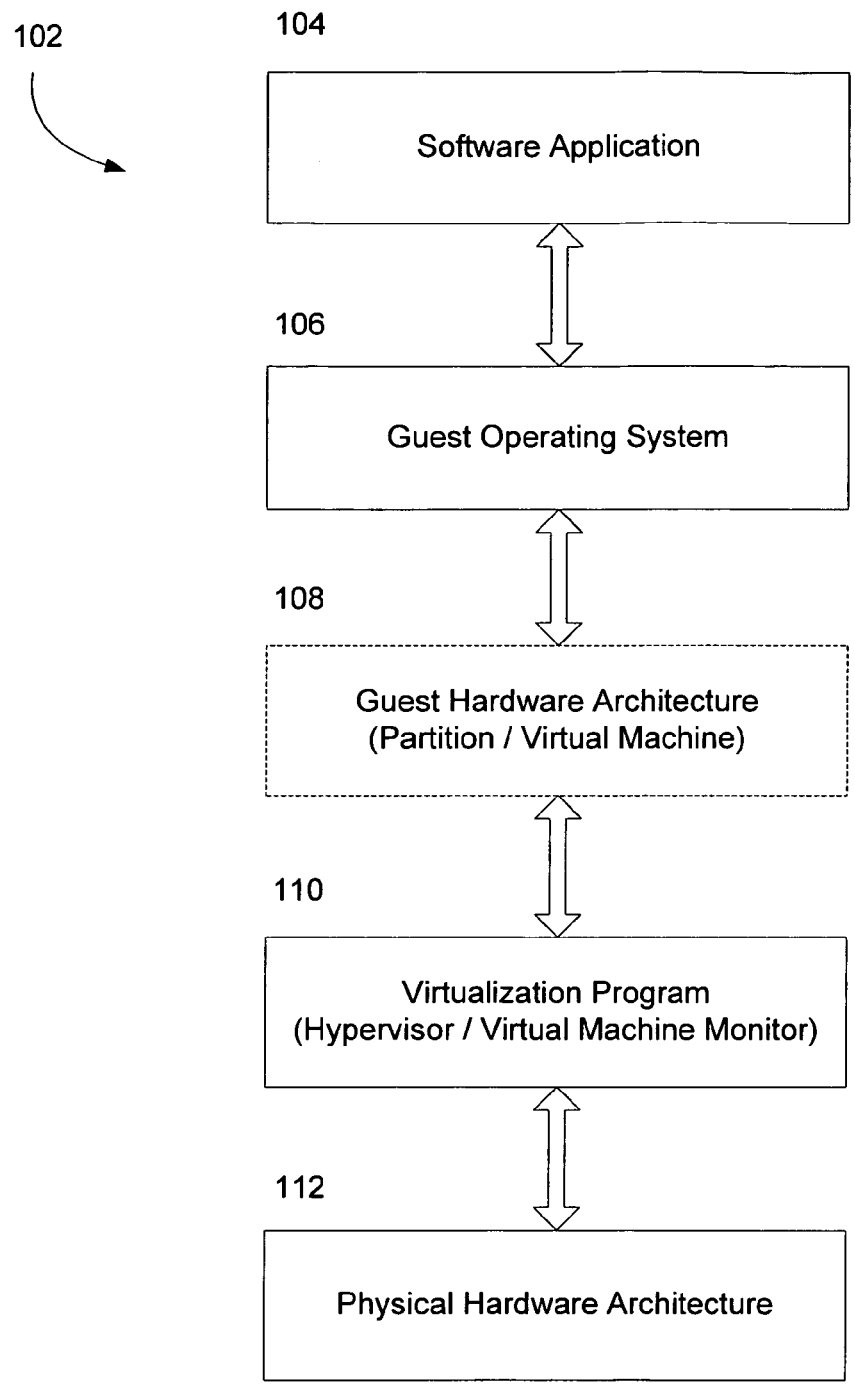
FIG. 1 is a block diagram representing the logical layering of the hardware and software architecture for a virtualized operating environment in a computer system.

Certain specific details are set forth in the following description and figures to provide a thorough understanding of various embodiments of the invention. Certain well-known details often associated with computing and software technology are not set forth in the following disclosure to avoid unnecessarily obscuring the various embodiments. Further, those of ordinary skill in the relevant art will understand that they can practice other embodiments without one or more of the details described below. Finally, while various methods are described with reference to steps and sequences in the following disclosure, the description as such is for providing a clear implementation of embodiments of the invention, and the steps and sequences of steps should not be taken as required to practice this invention.

It should be understood that the various techniques described herein may be implemented in connection with hardware or software or, where appropriate, with a combination of both. Thus, the methods and apparatus, or certain aspects or portions thereof, may take the form of program code (e.g., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the invention, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the invention in the context of one or more stand-alone computer systems, the invention is not so limited, but rather may be implemented in connection with any computing environment, such as a network or distributed computing environment. Still further, aspects of the invention may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

Overview

Various methods and systems are described for efficiently handling interrupts in a virtual machine environment. Interrupts are used in modern computing systems for a variety of purposes including, by way of examples, to notify processors of external events and to facilitate communication between processors of a multiprocessor system. Typically, an interrupt interrupts normal processing and temporarily diverts flow of control to an interrupt service routine ("ISR"). Various activities of a computing system can trigger interrupts. Some examples are pressing a key on a keyboard, receiving a network packet, and writing to or reading from a disk. Inter-processor interrupts ("IPIs") are a type of interrupt by which one processor may interrupt another processor in multiprocessor environment. IPIs may be used as a basis for inter-processor messaging.

Computing systems typically comprise one or more interrupt controllers that direct and arbitrate the flow of interrupts in a system. Interrupt controllers are responsible for prioritizing incoming interrupts and directing them to the appropriate processor in multiprocessor systems. Interrupt controllers may be realized in hardware and as such may be a discrete component or may be integrated with processors. Interrupt controllers may also be virtualized. This is typically accomplished through a combination of software and virtualization assists provided by hardware. The software may be a part of a virtual machine monitor that performs the same basic functions as a physical interrupt controller.

Typically, each interrupt source has a specified interrupt priority. As one example, these priorities could be numbered 0 to 255 with 255 being the top priority and 0 the lowest. Higher priority interrupts are allowed to interrupt an interrupt service routine that is processing a lower priority interrupt, but lower priority interrupts are not allowed to interrupt higher priority interrupts. When an interrupt service routine finishes executing, the processor on which it was running typically issues an EOI command, signaling to the interrupt controller that processing of the interrupt is complete and that lower priority interrupts that were deferred can now be delivered.

With a virtualized interrupt controller, the EOI command is implemented in software that performs the same operations as a physical interrupt controller would in response to the EOI command. This typically involves intercepting accesses to an EOI port or register and invoking a software handler. The combination of intercept and software handler typically require thousands or tens of thousands of cycles to handle an EOI command, adding significant overhead to the operation of interrupt service routines in a virtualized environment.

The methods and systems described herein provide mechanisms for efficiently handling interrupts. EOI commands can be skipped in many cases, significantly reducing the virtualization overhead related to interrupt delivery. In the case of IPIs used for inter-processor messaging, an end of message EOI need only be sent when a second message is already queued for slot containing a just-processed message. In some cases, a physical interrupt can be selectively EOIed irrespective of whether it is the highest priority in-service interrupt.

Virtualization in General

Diversity in operating systems and processor instruction sets can lead to reduced interoperability of software. Memory and I/O abstractions, both in high-level languages and in operating systems can remove some hardware resource dependencies, but some remain. Many operating systems are developed for a specific system architecture and are designed to manage hardware resources directly. This can limit the flexibility of a computer system in terms of available software and operating systems and can negatively impact security and failure isolation, especially when a system is shared by multiple users.

Virtualization provides a mechanism for increasing flexibility while enhancing security and reliability. Processors, memory, and I/O devices are examples of subsystems that can be virtualized. When a subsystem is virtualized, a virtual interface and virtual resources available through the virtual interface are mapped onto the interface and resources of a real system on which the virtualization is implemented. Virtualization can be applied not only to subsystems, but to an entire machine. A virtual machine's architecture is implemented in a layer of software on a real machine.

From a conceptual perspective, computer systems generally comprise one or more layers of software running on a foundational layer of hardware. This layering is done for reasons of abstraction. By defining the interface for a given layer of software, that layer can be implemented differently by other layers above it. In a well-designed computer system, each layer only knows about (and only relies upon) the immediate layer beneath it. This allows a layer or a "stack" (multiple adjoining layers) to be replaced without negatively impacting the layers above said layer or stack. For example, software applications (upper layers) typically rely on lower levels of the operating system (lower layers) to write files to some form of permanent storage, and these applications do not need to understand the difference between writing data to a floppy disk, a hard drive, or a network folder. If this lower layer is replaced with new operating system components for writing files, the operation of the upper layer software applications remains unaffected.

The flexibility of layered software allows a virtual machine (VM) to present a virtual hardware layer that is in fact another software layer. In this way, a VM can create the illusion for the software layers above it that said software layers are running on their own private computer system, and thus VMs can allow multiple "guest systems" to run concurrently on a single "host system."

FIG. 1 is a diagram representing the logical layering of the hardware and software architecture for a virtualized environment in a computer system. In FIG. 1, a virtualization program 110 runs directly or indirectly on the physical hardware architecture 112. The virtualization program 110 may be (a) a virtual machine monitor that runs alongside a host operating system or (b) a host operating system with a hypervisor component, where the hypervisor component performs the virtualization. The term virtual machine monitor is used as a general term for any of the various types of virtualization programs. The virtualization program 110 virtualizes a guest hardware architecture 108 (shown as dashed lines to illustrate the fact that this component is a partition or a "virtual machine"), that is, hardware that does not actually exist but is instead virtualized by the virtualizing program 110. A guest operating system 106 executes on the guest hardware architecture 108, and a software application 104 can run on the guest operating system 106. In the virtualized operating environment of FIG. 1, the software application 104 can run in a computer system 102 even if the software application 104 is designed to run on an operating system that is generally incompatible with a host operating system and the hardware architecture 112.

Figure 2:
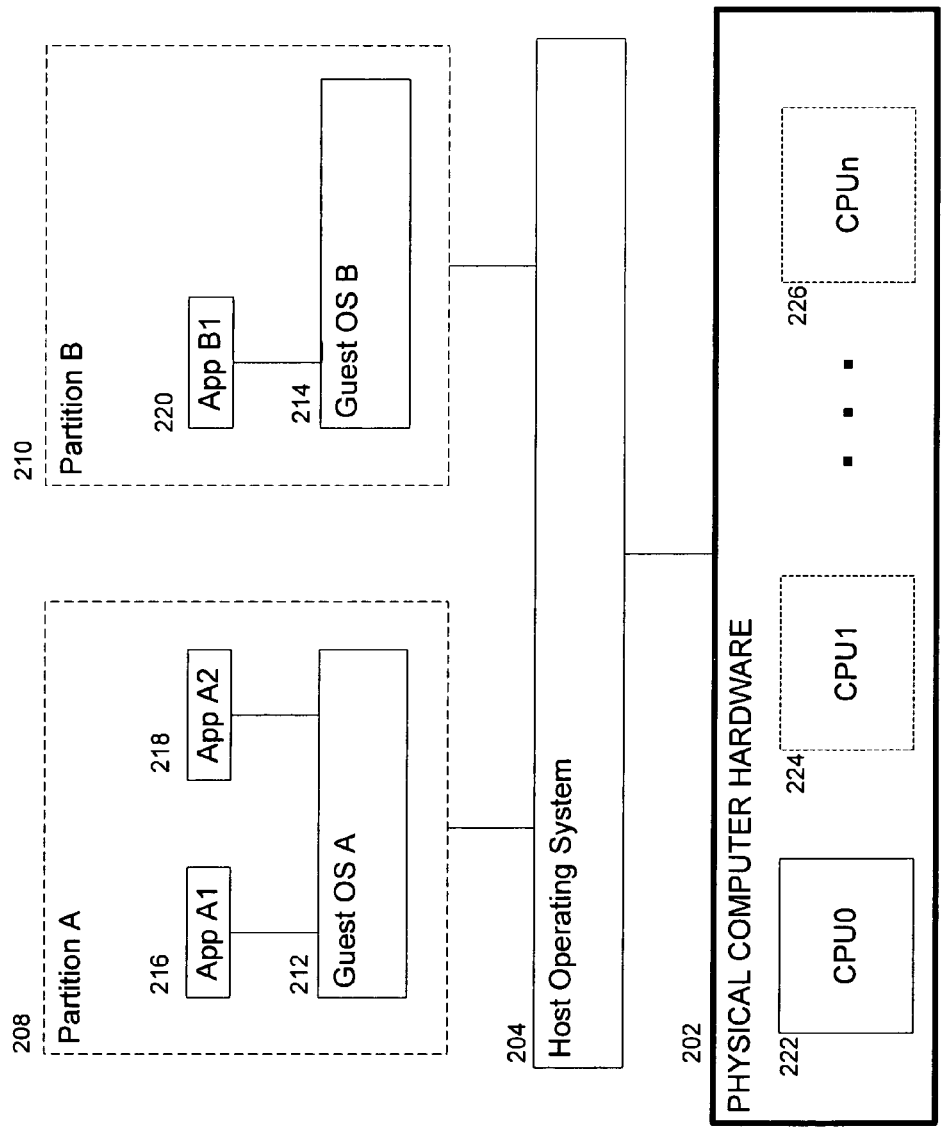
FIG. 2 is a block diagram representing a virtualized computing system, where virtualization is performed by the host operating system (either directly or via a hypervisor)

Next, FIG. 2 illustrates a virtualized computing system comprising a host operating system (host OS) software layer 204 running directly above physical computer hardware 202, where the host OS 204 provides access to the resources of the physical computer hardware 202 by exposing interfaces to partitions A 208 and B 210 for the use by operating systems A and B, 212 and 214, respectively. This enables the host OS 204 to go unnoticed by operating system layers 212 and 214 running above it. Again, to perform the virtualization, the host OS 204 may be a specially designed operating system with native virtualization capabilities or, alternately, it may be a standard operating system with an incorporated hypervisor component for performing the virtualization (not shown).

Referring again to FIG. 2, above the host OS 204 are two partitions, partition A 208, which may be, for example, a virtualized Intel 386 processor, and partition B 210, which may be, for example, a virtualized version of one of the Motorola 680X0 family of processors. Within each partition 208 and 210 are guest operating systems (guest OSs) A 212 and B 214, respectively. Running on top of guest OS A 212 are two applications, application A1 216 and application A2 218, and running on top of guest OS B 214 is application B1 220.

In regard to FIG. 2, it is important to note that partition A 208 and partition B 214 (which are shown in dashed lines) are virtualized computer hardware representations that exist only as software constructions. They are made possible due to the execution of specialized virtualization software(s) that not only presents partition A 208 and partition B 210 to Guest OS A 212 and Guest OS B 214, respectively, but which also performs all of the software steps necessary for Guest OS A 212 and Guest OS B 214 to indirectly interact with the real physical computer hardware 202. The physical computer hardware 202 may comprise a single central processing unit (CPU) 222, as in a uniprocessor environment, or multiple CPUs 222, 224, 226 as in a multiprocessor environment.

Figure 3:
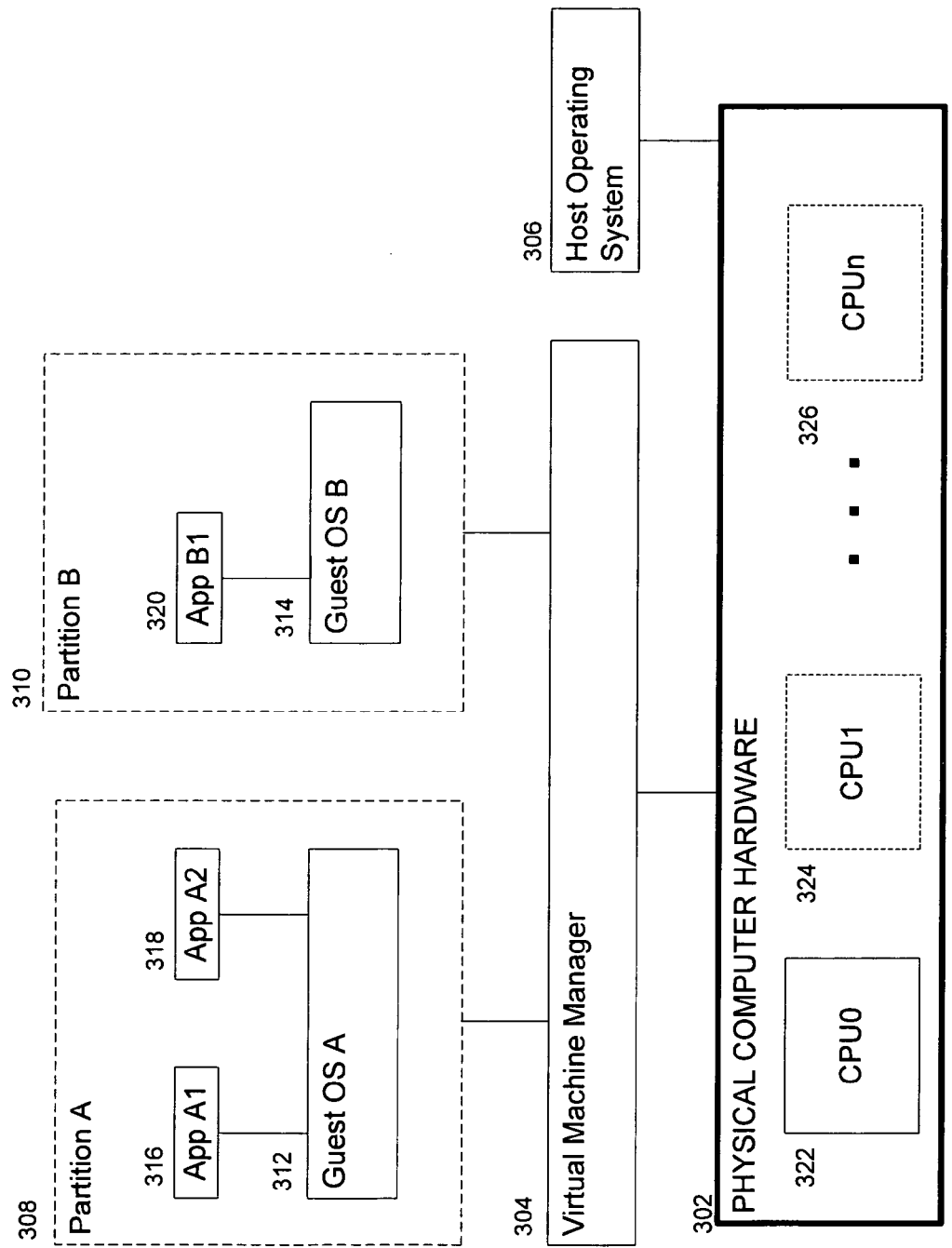
FIG. 3 is a block diagram representing an alternative virtualized computing system, where virtualization is performed by a virtual machine monitor running alongside a host operating system.

FIG. 3 illustrates an alternative virtualized computing system where the virtualization is performed by a VMM 304 running alongside the host operating system 306. In certain cases, the VMM 304 may be an application running above the host operating system 306 and interacting with the computer hardware 302 only through the host operating system 306. In other cases, such as shown in FIG. 3, the VMM 304 may instead comprise a partially independent software system that on some levels interacts indirectly with the computer hardware 302 via the host operating system 306, but on other levels the VMM 304 interacts directly with the computer hardware 302 (similar to the way the host operating system interacts directly with the computer hardware). And yet in other cases, the VMM 304 may comprise a fully independent software system that on all levels interacts directly with the computer hardware 302 (similar to the way the host operating system interacts directly with the computer hardware) without utilizing the host operating system 306 (although still interacting with the host operating system 306 in order to coordinate use of the computer hardware 302 and avoid conflicts and the like).

In the example illustrated in FIG. 3, two partitions, A 308 and B 310, lie conceptually above the VMM 304. Within each partition 308 and 310 are guest operating systems (guest OSs) A 312 and B 314, respectively. Running on top of guest OS A 312 are two applications, application. A1 316 and application A2 318, and running on top of guest OS B 314 is application B1 320. The physical computer hardware 302 may comprise a single central processing unit (CPU) 322, as in a uniprocessor environment, or multiple CPUs 322, 324, 326 as in a multiprocessor environment.

Figure 4:
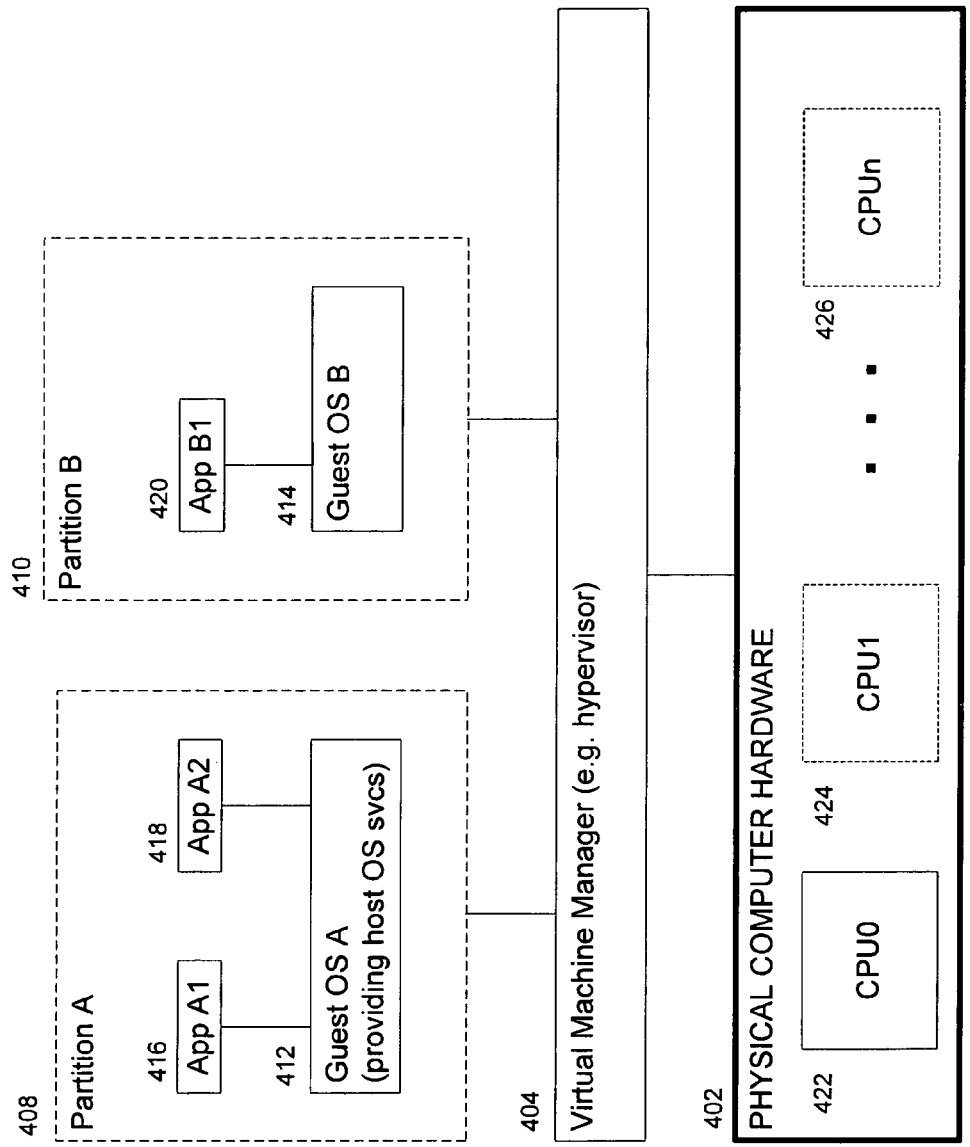
FIG. 4 is a block diagram representing another alternative virtualized computing system, where virtualization is performed by a virtualizer running independent of a host operating system.

FIG. 4 illustrates another alternative virtualized computing system where the virtualization is performed by a hypervisor 404. The hypervisor 404 comprises an independent software system that may interact directly with the computer hardware 402 without using a host operating system. The physical computer hardware 402 may comprise a single central processing unit (CPU) 422, as in a uniprocessor environment, or multiple CPUs 422, 424, 426 as in a multiprocessor environment.

In the example illustrated in FIG. 4, two partitions, A 408 and B 410, lie conceptually above the VMM 404. Within each partition 408 and 410 are guest operating systems (guest OSs) A 412 and B 414, respectively. Running on top of guest OS A 412 are two applications, application A1 416 and application A2 418, and running on top of guest OS B 414 is application B1 420. Guest OS A 412 provides host OS services. The physical computer hardware 402 may comprise a single central processing unit (CPU) 422, as in a uniprocessor environment, or multiple CPUs 422, 424, 426 as in a multiprocessor environment.

All of these variations for implementing the above mentioned partitions are just exemplary implementations, and nothing herein should be interpreted as limiting the disclosure to any particular virtualization aspect.

Interrupt Handling in General

Figure 5:
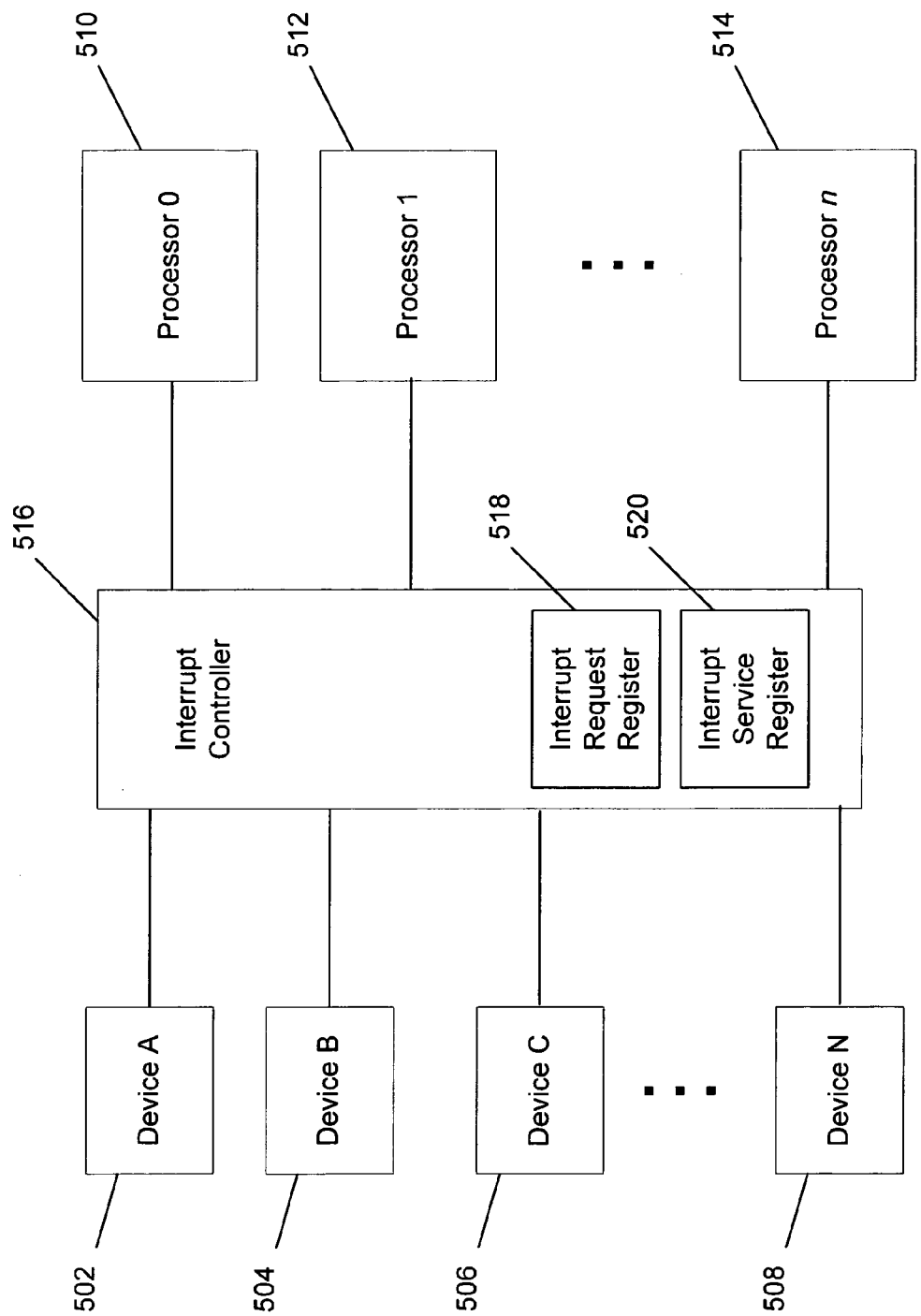
FIG. 5 is a block diagram of a portion of a computing system with an interrupt controller.

FIG. 5 is a block diagram of an illustrative example of a portion of a multiprocessor computing system having an interrupt controller. Any number of devices 502, 504, 506, 508 may serve as sources of interrupt requests. Devices 502, 504, 506, 508 may be physical devices, such as, for example, keyboards, disk drives, network cards, or may be virtualized devices. Interrupt requests may also be generated by any of the processors 510, 512, 514.

An interrupt controller 516 arbitrates and directs the processing of interrupt requests. The interrupt controller 516 may be a physical device, such as a programmable interrupt controller ("PIC") or an advanced programmable interrupt controller ("APIC"). Alternatively, the interrupt controller 516 may be virtualized, in which case its functions are performed by software, such as a software handler within a VMM.

Most interrupt controllers track requested and in-service interrupt requests. This is often done through the use of two bit vectors where each bit represents an individual interrupt source. One bit vector is called the interrupt request register 518, and a second is called the interrupt service register 520. When an interrupt controller 516 receives a request for an interrupt, it sets a corresponding bit in the interrupt request register 518. When the interrupt controller 516 delivers an interrupt to a processor 510, 512, or 514, it clears a corresponding bit in the interrupt request register 518 and sets a corresponding bit in the interrupt service register 520. When the interrupt controller 516 receives an EOI, it knows that the corresponding interrupt is no longer being serviced, and so clears the corresponding bit in the interrupt service register 520. At this time, it scans the interrupt request register 518 to determine the highest-priority requested interrupt that has not yet been serviced. If the priority of such an interrupt is higher than the highest-priority in-service interrupt, the interrupt controller interrupts the interrupt service routine of the lower-priority in-service interrupt.

Figure 6:
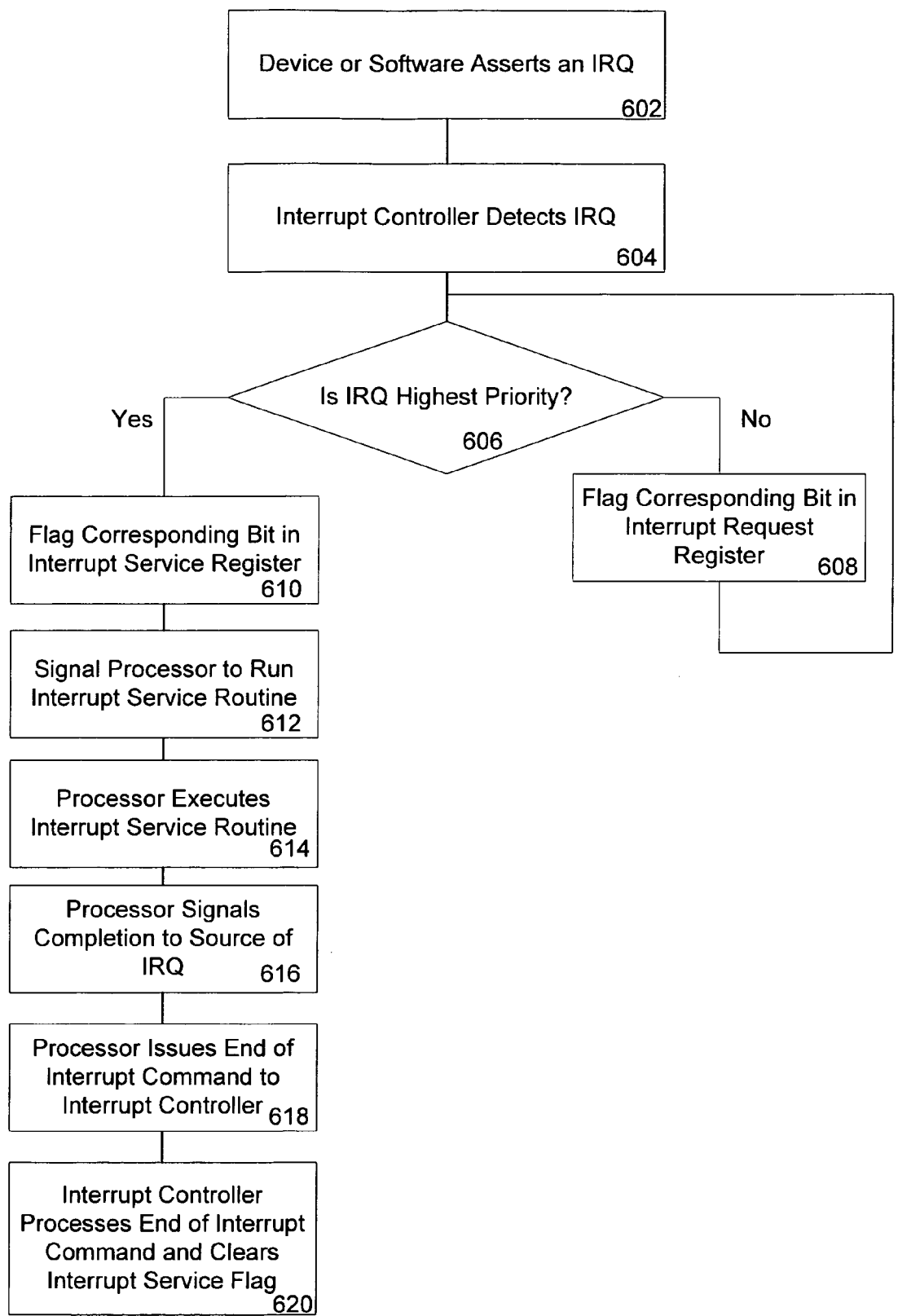
FIG. 6 is a flow chart illustrating a way of handling an interrupt request.

The traditional life cycle of an interrupt request is depicted in FIG. 6. A device or software begins the process by asserting an interrupt request ("IRQ") 602. Interrupt requests can be generated by a wide variety of sources. Sources may include, by way of examples and not for purposes of limitation, keyboards, mice, sound cards, modems, communications ports, timing devices, and software instructions. In a "level-triggered" interrupt, a device wishing to signal an interrupt drives a voltage on an interrupt request line to a predetermined level defined as "active" and holds it there until the interrupt has been serviced. In an "edge-triggered" interrupt, an interrupt request is signaled by a level transition on an interrupt request line wherein a device wishing to signal an interrupt drives a pulse onto the interrupt request line and then returns the line to its quiescent state.

Once an interrupt controller detects the IRQ 604, it determines whether the IRQ has a higher priority than any currently in-service interrupts 606, possibly by examining the interrupt service register 520 (FIG. 5). If a higher priority interrupt is in-service when the IRQ is detected, then the interrupt controller flags a corresponding bit in the interrupt request register 608 so as to record the pending request. If the requested interrupt has a higher priority than any in-service interrupt, then the interrupt controller flags a corresponding bit in the interrupt service register 610 and signals an appropriate processor to run a corresponding interrupt service routine 612. Upon completion of the execution of the interrupt service routine 614, the processor may indicate to the interrupting device that the interrupt is handled 616, typically by writing to or reading from an I/O port or memory-mapped register. The processor signals the interrupt controller that the interrupt has been handled by sending an EOI command 618, typically delivered through an I/O port or a memory-mapped-I/O access such as a read from or write to a register. The interrupt controller processes the EOI command and clears the corresponding flag in the interrupt service register 620. The EOI command tells the interrupt controller that a lower-priority interrupt that had been deferred can now be delivered. For example, if a network packet arrived, triggering an interrupt, while a keyboard interrupt of higher priority was being serviced, the network packet interrupt request might have been held pending by the interrupt controller until the higher priority keyboard interrupt was completely serviced. Processing an EOI command may take tens or hundreds of cycles for a physical interrupt controller or even thousands of cycles for a virtualized interrupt controller.

Figure 7:
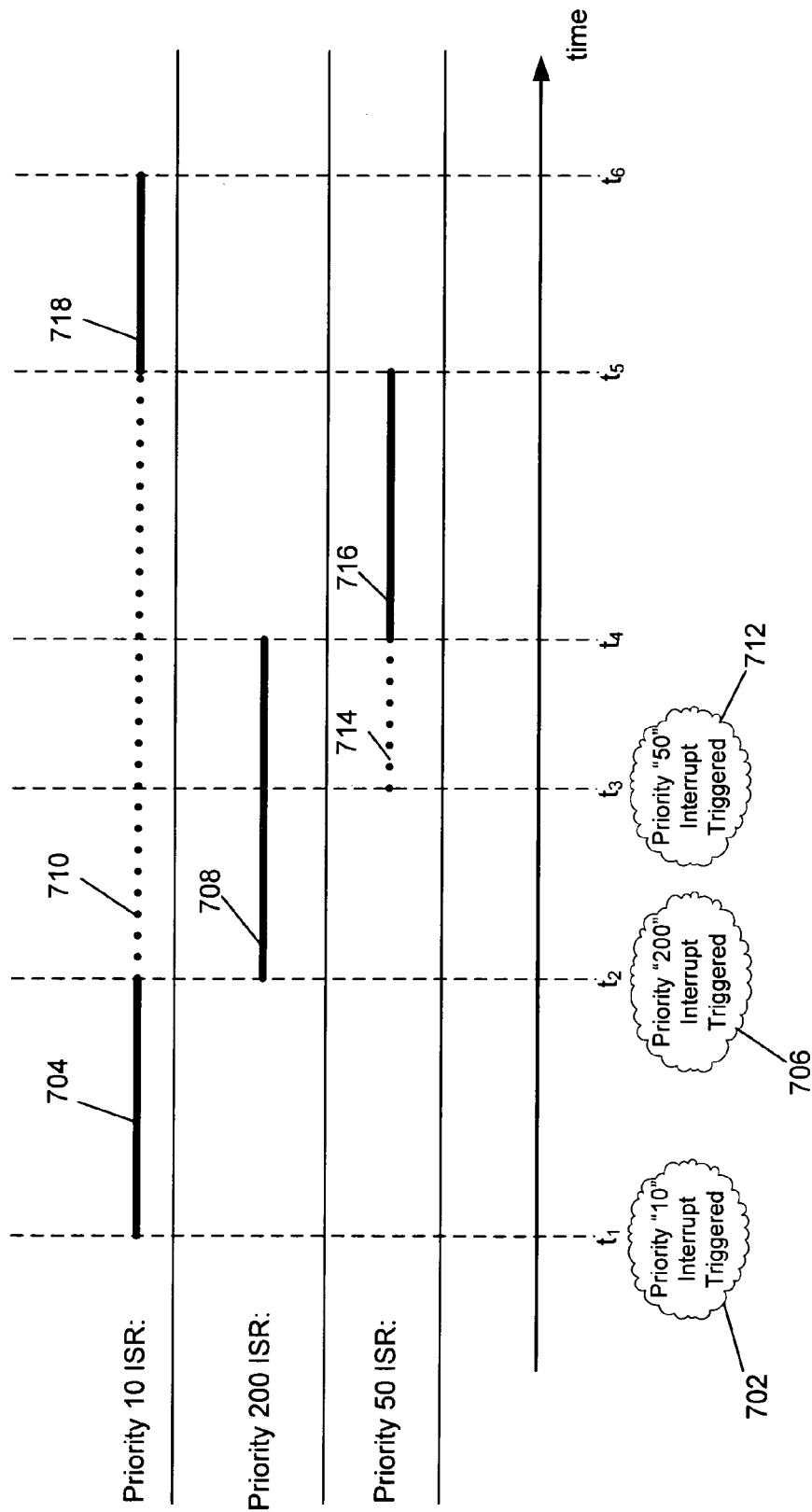
FIG. 7 depicts a timeline for an example of interrupt priorities.

FIG. 7 describes an example that illustrates the general concept of interrupt priority and is not intended to be limiting. Suppose that at time $t_1$ an interrupt source of priority 10 requests an interrupt 702. The interrupt controller interrupts the processor which invokes an interrupt service routine 704 associated with the interrupt source. Now suppose that at time $t_2$, before the ISR for the priority 10 interrupt completes processing, an interrupt source of priority 200 requests an interrupt 706 destined for the same processor. The interrupt controller interrupts the processor again, and the ISR 708 for the priority 200 interrupt begins executing while the ISR for the priority 10 interrupt is suspended 710. Suppose that a third interrupt source at priority 50 requests an interrupt 712 at time $t_3$, before the priority 200 ISR 708 completes. The interrupt controller will defer delivery 714 of this interrupt until the processor has completed execution of the priority 200 ISR at time $t_4$. The priority 50 ISR will be invoked 716 after the priority 200 ISR 708 completes. When the priority 50 ISR 716 completes, at time $t_5$, execution of the priority 10 ISR resumes 718 and is completed at time $t_6$.

Virtualized Interrupt Controllers

In a virtualized environment, processors and interrupt controllers may be virtualized. This is done through a combination of software (for example, a VMM) and virtualization assists provided by hardware. In a typical arrangement, the EOI command is emulated by the VMM. This is done by intercepting accesses to an EOI port or register. The intercept invokes a software handler within the VMM that performs the same functions as a physical interrupt controller in response to the EOI. The combination of the intercept and the software handler can require thousands or tens of thousands of cycles. This adds significant overhead to the ISR when executing within a virtualized environment.

Typically a VMM accepts interrupts and redirects them to guest operating systems as virtual interrupts. Interrupts can be generated from a variety of sources, including, by way of examples and not limitation, physical hardware devices, a partition emulating a hardware device, a partition wishing to post a message or signal an event to another partition, or the VMM wishing to signal a partition. The VMM typically issues an EOI command to a physical interrupt controller after an interrupt has been accepted. For level-triggered interrupts it is generally not safe to issue an EOI command until the ISR in the guest operating system has run and issued an EOI command to the virtual interrupt controller. Certain physical interrupt controllers like the APIC allow only the highest-priority in-service interrupt to be EOIed. However in certain situations the VMM may need to selectively EOI an interrupt which is not the highest-priority in-service interrupt. As an illustration, consider what happens when two level triggered interrupts arrive one after the other where the first one is of lower priority. The VMM accepts the first interrupt and redirects it to the guest operating system. Before the ISR in the guest has issued an EOI command, the second interrupt arrives. Subsequently the guest operating system issues an EOI command for the first interrupt. In this situation the VMM cannot EOI the first interrupt since a higher priority interrupt is already in-service and issuing an EOI command to the physical interrupt controller will EOI the higher priority interrupt.

In accordance with the disclosure herein, a guest operating system is allowed to program some interrupt sources as "auto-EOI." When an interrupt source is marked as auto-EOI, the traditional interrupt prioritization behavior is modified. An auto-EOI interrupt does not block the delivery of other interrupts. Thus, in effect, an auto-EOI interrupt behaves similarly to a lowest-priority interrupt in that any other interrupt, including other auto-EOI interrupts, are allowed to interrupt the execution of its associated ISR.

When an auto-EOI interrupt is delivered, the bit associated with the auto-EOI interrupt in the interrupt service register is immediately cleared. Effectively, the virtualized interrupt controller automatically generates an EOI at the time the auto-EOI interrupt is delivered. With an auto-EOI interrupt, it is desirable that the interrupt source moderate itself by not requesting subsequent interrupts until it knows the previous interrupt was handled. Otherwise, each succeeding interrupt would interrupt the previous ISR, potentially overflowing the processor's stack.

In one embodiment, the auto-EOI property is specified in a virtual register associated with a synthetic interrupt source (SINT). The format of the virtual register is as follows:

| Bits | Description | Attributes |
| --- | --- | --- |
| 63:18 | RsvdP (value should be preserved) | Read/write |
| 17 | Auto-EOI<br>Set if an implicit EOI should be<br>performed upon interrupt delivery | Read/write |
| 16 | Set if the SINT is masked | Read/write |
| 15:8 | RsvdP (value should be preserved) | Read/write |
| 7:0 | Vector | Read/write |

At virtual processor creation time, the default value of all SINT registers is 0x0000000000010000. Thus, all synthetic interrupt sources are masked by default. The guest must unmask them by programming an appropriate vector and clearing bit 16.

The Auto-EOI flag indicates that an implicit EOI should be performed by the VMM when an interrupt is delivered to the virtual processor. In addition, the VMM will automatically clear the corresponding flag in the in-service register of the virtual interrupt controller. If the guest enables this behavior, then it must not perform an explicit EOI in its interrupt service routine.

Figure 8:
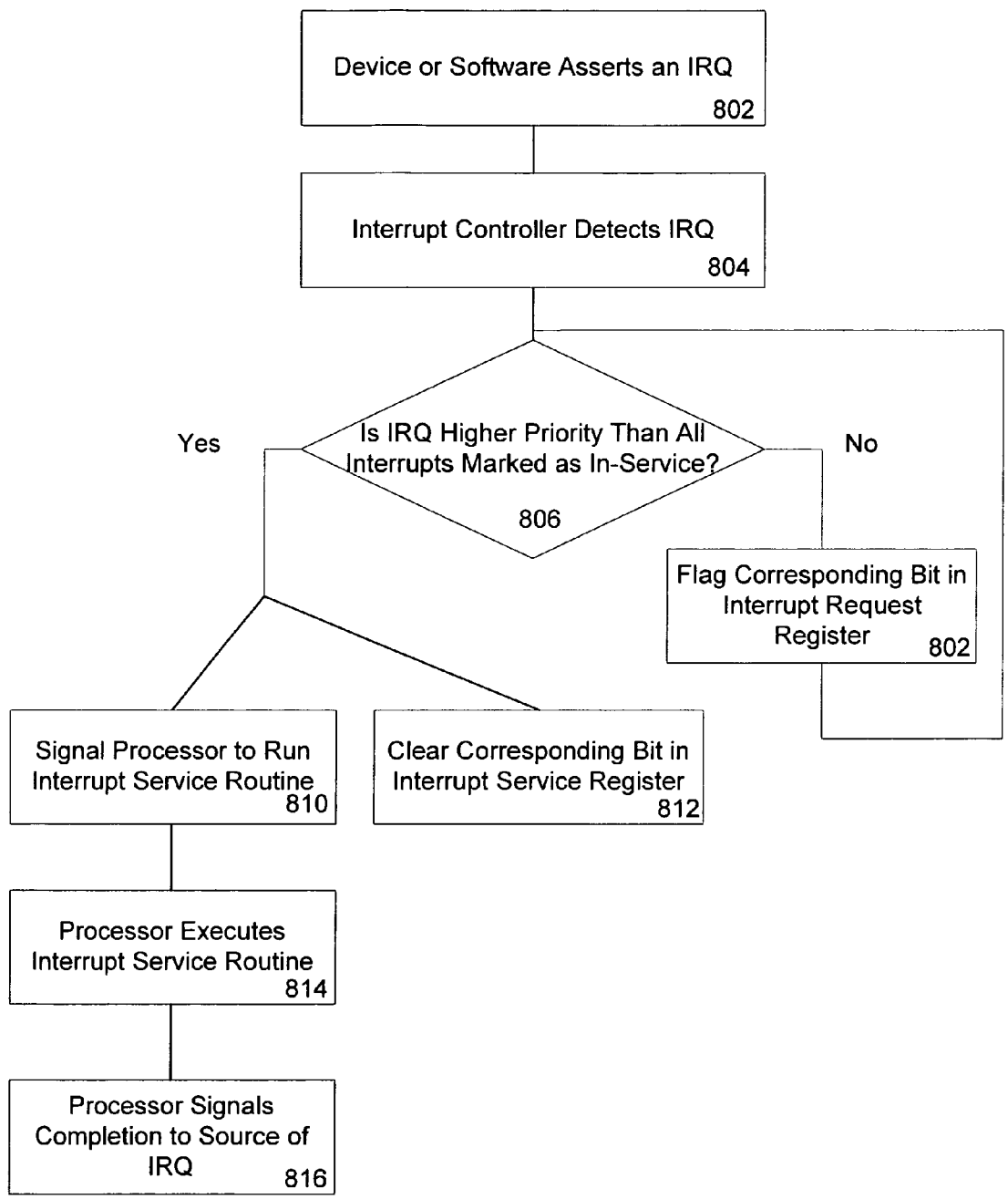
FIG. 8 is a flow chart illustrating a way of handling an interrupt request using an automatic EOI in accordance with the teachings herein.

FIG. 8 depicts the life cycle of an auto-EOI interrupt request according to the disclosure herein. A device or software begins the process by asserting an IRQ 802. Once an interrupt controller detects the IRQ 804, it determines whether the IRQ has a higher priority than any interrupts currently marked as in-service 806, possibly by examining the interrupt service register 520 (FIG. 5). If a higher priority interrupt is marked as in-service when the IRQ is detected, then the interrupt controller flags a corresponding bit in the interrupt request register 808 so as to record the pending request. If the requested interrupt has a higher priority than any interrupt marked as in-service, then the interrupt controller signals an appropriate processor to run a corresponding interrupt service routine 810 and clears a corresponding bit in the interrupt service register 812. After the processor completes execution of the interrupt service routine 814, the processor may indicate to the interrupting device that the interrupt is handled 816, typically by writing to or reading from an I/O port or memory-mapped register.

Thus, with an auto-EOI interrupt request, there is no need for the processor to issue an explicit EOI command. Because the corresponding bit in the interrupt service register was cleared 812 when the interrupt was sent to the processor, the auto-EOI interrupt will not block the delivery of other interrupts. Because the interrupt was effectively EOIed when it was delivered, the computational cycles normally required to process an EOI command are not used.

The use of a virtualized interrupt controller allows a VMM to selectively EOI physical interrupts when the physical interrupt controller does not support such functionality. This may be accomplished by maintaining a list of pending EOIs, i.e., interrupts that need to be EOIed at a later time. For example, when a guest operating system issues an EOI command, the VMM may check whether the interrupt being EOIed is indeed the highest priority in-service interrupt in the physical interrupt controller. If not, the VMM simply adds the interrupt to the list of pending EOIs. If, on the other hand, the interrupt being EOIed is the highest priority in-service interrupt, the VMM not only EOIs the current interrupt, but also EOIs other interrupts on the list of pending EOIs.

Inter-Partition Messaging

Some VMMs use interrupts as the basis for inter-partition messaging. A partition is an isolation boundary enforced by a VMM and is the "container" for a virtual machine. If software running within one partition needs to communicate with software running within a second partition on the same machine, it is able to do so through the use of inter-partition messages. These messages typically contain small payloads. For example, in the case of one known hypervisor, they message payload may comprise up to 240 bytes plus a 16-byte header. When a message is sent, it is queued by the hypervisor until a virtual processor associated with the destination partition is ready to execute. At that time, the hypervisor may deliver an interrupt to that virtual processor. This causes a corresponding ISR to be invoked. The ISR is responsible for reading the message and reacting to its contents. As described above, the ISR generally must "EOI" the interrupt after the interrupt has been serviced. In this case, the EOI would be sent after the message has been read. Inter-partition messaging must be as fast as possible. The traditional EOI mechanism adds an undesirable overhead, using possibly tens of thousands of cycles to notify the virtualized interrupt controller that the message has been read and that subsequent messages and lower priority pending interrupts can be delivered.

In accordance with the disclosure herein, the overhead of the traditional EOI mechanisms for signaling that an inter-partition message has been processed can be avoided. In one embodiment, a message slot is provided for each SINT and the layout of a message is defined by the data structures described in Table 1 below.

TABLE 1

```
typedef struct
{
    UINT8 MessagePending:1;
    UINT8 Reserved:7;
} HV_MESSAGE_FLAGS;
typedef struct
{
    HV_MESSAGE_TYPE      MessageType;
    UINT8 PayloadSize;
    HV_MESSAGE_FLAGS     MessageFlags
    UINT8 Reserved[2];
    union
    {
        HV_PARTITION_ID   Sender;
        HV_PORT_ID        Port;
    };
} HV_MESSAGE_HEADER;
#define HV_MESSAGE_MAX_PAYLOAD_BYTE_COUNT   240
```

TABLE 1-continued

```
#define HV_MESSAGE_MAX_PAYLOAD_QWORD_COUNT  30
typedef struct
{
    HV_MESSAGE_HEADER    Header;
    UINT64
Payload[HV_MESSAGE_MAX_PAYLOAD_QWORD_COUNT];
} HV_MESSAGE;
```

Figure 9:
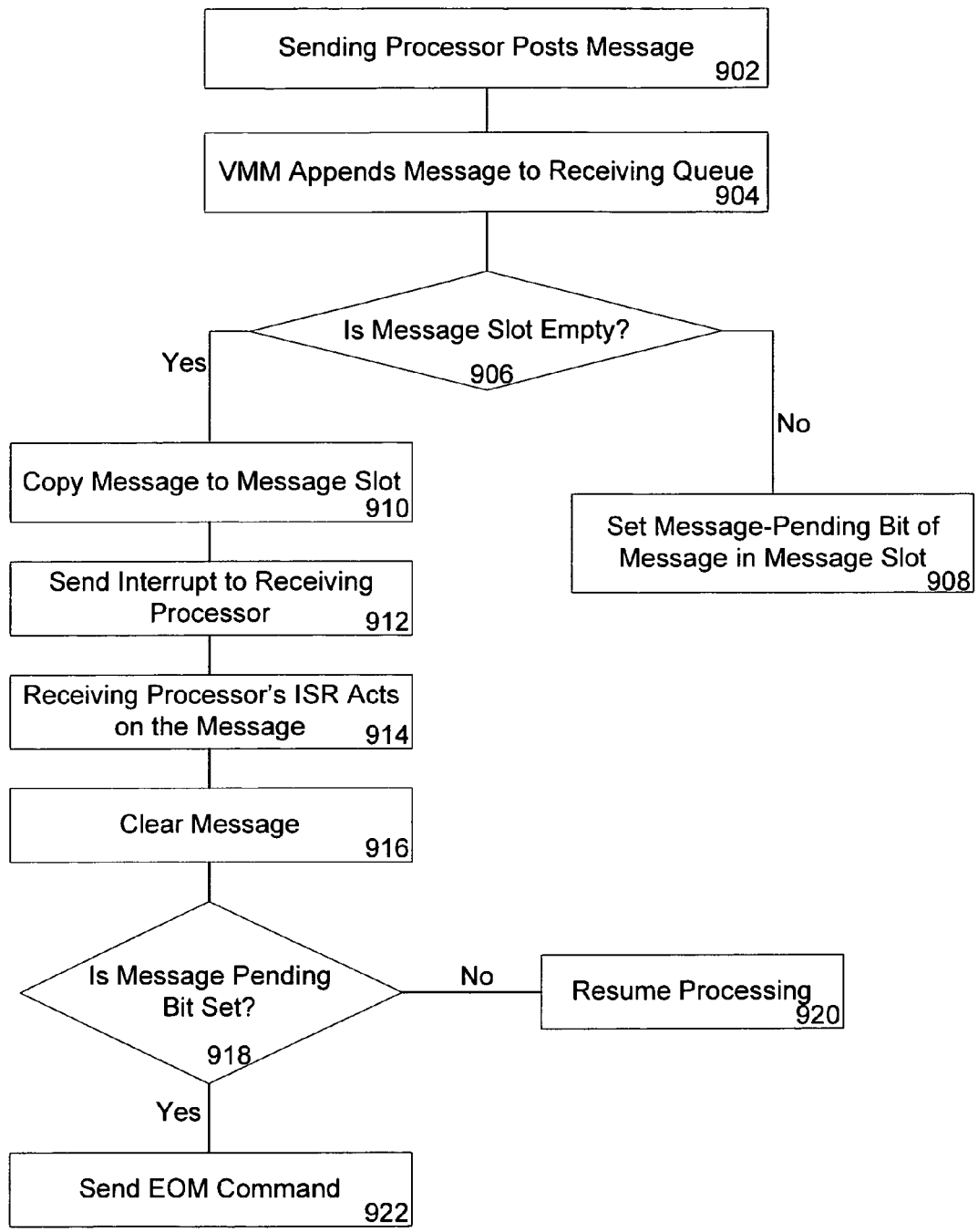
FIG. 9 is a flow chart illustrating a way of handling an inter-processor message according to the teachings herein.

FIG. 9 is a flow chart depicting an embodiment of inter-processor message handling in accordance with the disclosure herein. A sending processor posts an inter-processor message 902 corresponding to a specified SINT which has been designated as auto-EOI. The VMM appends the message to a message queue 904 and determines whether the message slot corresponding to the specified SINT is empty 906. If a previous message is still present in the message slot, the VMM sets the Message Pending bit in the header of the message in the slot 908. If the message slot is empty, the VMM copies the message to the message slot 910 and sends an interrupt associated with the specified SINT to the receiving processor 912. When a guest OS running on the receiving processor receives an interrupt associated with a SINT, its ISR reads the message from the corresponding message slot and performs an action based on the message type and payload 914. When processing of the message is completed, the ISR clears the message type 916. For example, in accordance with the data structures defined in Table 1, the ISR may clear the message type by writing a specified value to HV_MESSAGE_TYPE. The ISR then examines the Message Pending bit of the just-processed message 918. If the Message Pending bit is not set, meaning that no further message is queued for the message slot, no further action is required by the ISR 920. This should be the case most often. In particular, there is no need for the ISR to send an EOI command, thus avoiding considerable computational overhead.

If the Message Pending bit was set, the ISR sends the virtualized interrupt controller an end-of-message ("EOM") command 922, telling the VMM that it should re-attempt the delivery of a queued message. The computational cost of an EOM command is roughly the same as for an EOI command, but the EOM is only sent in the rare case when additional message are queued for a message slot. Thus, the average cost of processing an inter-processor message is significantly reduced.

While the present disclosure has been described in connection with various embodiments, illustrated in the various figures, it is understood that similar aspects may be used or modifications and additions may be made to the described aspects of the disclosed embodiments for performing the same function of the present disclosure without deviating therefrom. For example, in various aspects of the disclosure, mechanisms were disclosed for improving the operational efficiency of interrupt processing in virtualized environments. However, other equivalent mechanisms to these described aspects are also contemplated by the teachings herein. Therefore, the present disclosure should not be limited to any single aspect, but rather construed in breadth and scope in accordance with the appended claims.

What is claimed:

1. A method of processing interrupts for a virtualized computing system, the virtualized computing system comprising a virtual machine monitor and at least one guest operating system, the method comprising:
    receiving a first interrupt request at a virtualized interrupt controller; and clearing an interrupt service flag corresponding to the first interrupt request substantially immediately after the first interrupt request is received.

2. The method of claim 1, further comprising performing an action prescribed by the first interrupt and wherein clearing an interrupt service flag corresponding to the first interrupt request substantially immediately after the first interrupt request is received comprises clearing the interrupt service flag corresponding to the first interrupt request before the action prescribed by the first interrupt has been completely performed.

3. The method of claim 1, further comprising:
performing an action prescribed by the first interrupt; and
permitting the delivery of other interrupts while performing the action prescribed by the first interrupt.

4. The method of claim 3, wherein performing an action prescribed by the first interrupt is mediated by a virtual machine monitor.

5. The method of claim 1, wherein the first interrupt request corresponds to a request for a first inter-partition message.

6. The method of claim 5, further comprising:
providing at least one message slot, each said message slot being associated with a virtual processor; and
setting a message-pending flag associated with the first inter-partition message if a second inter-partition message is queued for the message slot associated with a processor of the first interrupt request before processing of the first inter-partition message has been completed.

7. The method of claim 6, further comprising:
sending an end-of-message command to the virtualized interrupt controller after processing an inter-partition message is completed if a message-pending flag associated with the inter-partition message is set.

8. A method of processing interrupts for a virtualized computing system, the virtualized computing system comprising a virtual machine monitor and at least one guest operating system, the method comprising:
receiving an end-of-interrupt command from a guest operating system;
determining that the end-of-interrupt command does not correspond to a highest priority interrupt flagged as being in-service;
recording information identifying the interrupt corresponding to the received end-of-interrupt command; and
processing the end-of-interrupt command after an end-of-interrupt command for the highest priority interrupt flagged as being in-service is received.

9. The method of claim 8, further comprising:
processing end-of-interrupt commands for interrupts corresponding to the recorded information upon completion of processing an end-of-interrupt command for a highest-priority in-service interrupt.

10. A system, comprising:
a virtual machine monitor; and
a virtualized interrupt controller for clearing an interrupt service flag corresponding to an interrupt request substantially immediately after the interrupt request is received.

11. The system of claim 10, wherein the virtualized interrupt controller clears an interrupt service flag corresponding to an interrupt request before an action prescribed by the interrupt request is completely performed.

12. The system of claim 10, wherein the virtual machine monitor flags a first inter-partition message when a second inter-partition message is queued before processing of the first inter-partition message is completed and wherein the virtualized interrupt controller is signaled when processing of the first inter-partition message is completed only if the first inter-partition message is flagged.

13. A system comprising:
a virtual machine monitor; and
a virtualized interrupt controller, wherein the virtualized interrupt controller records information identifying an interrupt corresponding to a received end-of-interrupt command to enable processing the received end-of-interrupt command after processing of a higher priority in-service interrupt is completed.

14. A computer readable medium comprising computer executable instructions for managing interrupts, the instructions comprising instructions for clearing an interrupt service flag corresponding to an interrupt service request substantially immediately after the interrupt service request is received by a virtualized interrupt controller.

15. The computer readable medium of claim 14, further comprising computer executable instructions for performing an action prescribed by an interrupt service request while permitting the delivery of other interrupt service requests.

16. The computer readable medium of claim 14, further comprising computer executable instructions for facilitating inter-processor communication comprising:
instructions for setting a message-pending flag associated with a first inter-processor message if a second inter-processor message is queued for a processor receiving the first inter-processor message before processing of the first inter-processor message is completed.

17. The computer readable medium of claim 16, wherein the message-pending flag associated with a first inter-processor message is embodied as a bit in a header of the first inter-processor message.

18. The computer readable medium of claim 16, further comprising computer executable instructions for signaling a virtualized interrupt controller after processing an inter-partition message is completed if a message-pending flag associated with the inter-partition message has been set.

19. A computer readable medium comprising computer executable instructions for managing interrupts, the instructions comprising instructions for queuing an end-of-interrupt command for later processing if the end-of-interrupt command does not correspond to a highest priority interrupt that is being processed when the end-of-interrupt command is received.

20. The computer readable medium of claim 19, further comprising instructions for processing a queued end-of-interrupt command after processing an end-of-interrupt command corresponding to an interrupt of a higher priority than the interrupt corresponding to the queued end-of-interrupt command.

* * * * *